United States Patent
Daborn et al.

(10) Patent No.: US 9,679,564 B2
(45) Date of Patent: Jun. 13, 2017

(54) HUMAN TRANSCRIPTIONIST DIRECTED POSTERIOR AUDIO SOURCE SEPARATION

(71) Applicant: Nuance Communications, Inc., Burlington, MA (US)

(72) Inventors: Andrew Johnathon Daborn, Berkshire (GB); Uwe Helmut Jost, Maidenhead (GB)

(73) Assignee: Nuance Communications, Inc., Burlington, MA (US)

( * ) Notice: Subject to any disclaimer, the term of this patent is extended or adjusted under 35 U.S.C. 154(b) by 579 days.

(21) Appl. No.: 13/712,131

(22) Filed: Dec. 12, 2012

(65) Prior Publication Data

US 2014/0163982 A1 Jun. 12, 2014

(51) Int. Cl.
| | |
|---|---|
| G10L 15/00 | (2013.01) |
| G10L 15/06 | (2013.01) |
| G10L 13/00 | (2006.01) |
| G10L 13/08 | (2013.01) |
| G10L 15/26 | (2006.01) |
| G10L 17/22 | (2013.01) |
| G10L 21/0272 | (2013.01) |

(52) U.S. Cl.
CPC .............. *G10L 15/26* (2013.01); *G10L 17/22* (2013.01); *G10L 21/0272* (2013.01)

(58) Field of Classification Search
None
See application file for complete search history.

(56) References Cited

U.S. PATENT DOCUMENTS

| | | | | |
|---|---|---|---|---|
| 6,556,971 B1* | 4/2003 | Rigsby | .................. | G06F 3/0481 33/286 |
| 8,924,214 B2* | 12/2014 | Willey | .................... | G01S 7/415 704/246 |
| 2004/0013252 A1* | 1/2004 | Craner | .................. | H04M 1/247 379/142.01 |
| 2005/0204309 A1* | 9/2005 | Szeto | .................. | H04L 12/5845 715/811 |
| 2006/0155549 A1* | 7/2006 | Miyazaki | ................ | G10L 15/26 704/275 |
| 2007/0124144 A1* | 5/2007 | Johnson | .................. | H04L 69/40 704/246 |

(Continued)

*Primary Examiner* — Richemond Dorvil
*Assistant Examiner* — Thuykhanh Le
(74) *Attorney, Agent, or Firm* — Mark H. Whittenberger, Esq.; Holland & Knight LLP

(57) ABSTRACT

A graphical user interface is described for human guided audio source separation in a multi-speaker automated transcription system receiving audio signals representing speakers participating together in a speech session. A speaker avatar for each speaker is distributed about a user interface display to suggest speaker positions relative to each other during the speech session. There also is a speaker highlight element on the interface display for visually highlighting a specific speaker avatar corresponding to an active speaker in the speech session to aid a human transcriptionist listening to the speech session to identify the active speaker. A speech signal processor performs signal processing of the audio signals to isolate an audio signal corresponding to the highlighted speaker avatar. A session transcription processor performs automatic speech recognition (ASR) of the signal processed audio signal for the speech session as supervised by the human transcriptionist and reflecting position of the speaker highlight element.

18 Claims, 3 Drawing Sheets

(56) References Cited

U.S. PATENT DOCUMENTS

| | | | | |
|---|---|---|---|---|
| 2007/0133437 | A1* | 6/2007 | Wengrovitz | H04M 3/56 370/260 |
| 2007/0188901 | A1* | 8/2007 | Heckerman | G09B 19/00 360/23 |
| 2009/0018826 | A1* | 1/2009 | Berlin | G10L 15/07 704/223 |
| 2009/0089056 | A1* | 4/2009 | Fujii | G06F 17/30746 704/246 |
| 2009/0112589 | A1* | 4/2009 | Hiselius | H04M 1/576 704/246 |
| 2010/0020951 | A1* | 1/2010 | Basart | H04M 15/06 379/142.01 |
| 2011/0161076 | A1* | 6/2011 | Davis | G06F 3/04842 704/231 |
| 2011/0239136 | A1* | 9/2011 | Goldman | G06N 3/006 715/757 |
| 2011/0244954 | A1* | 10/2011 | Goldman | A63F 13/65 463/30 |
| 2012/0245936 | A1* | 9/2012 | Treglia | 704/235 |
| 2012/0316876 | A1* | 12/2012 | Jang | G06F 3/167 704/246 |
| 2013/0297308 | A1* | 11/2013 | Koo | G06F 3/167 704/235 |
| 2013/0304476 | A1* | 11/2013 | Kim et al. | 704/270 |
| 2013/0311178 | A1* | 11/2013 | Lee | G10L 15/26 704/235 |
| 2013/0311186 | A1* | 11/2013 | Lee | G10L 15/26 704/260 |
| 2013/0314476 | A1* | 11/2013 | Kodama | B41J 2/17513 347/86 |
| 2014/0126758 | A1* | 5/2014 | Van Der Wijst | H04S 7/304 381/310 |
| 2014/0337016 | A1* | 11/2014 | Herbig | G10L 25/27 704/201 |

\* cited by examiner

HUMAN TRANSCRIPTIONIST DIRECTED POSTERIOR AUDIO SOURCE SEPARATION

TECHNICAL FIELD

The present invention relates to human guided audio source separation in a multi-speaker automated transcription system.

BACKGROUND ART

An automatic speech recognition (ASR) system determines a semantic meaning of a speech input. Typically, the input speech is processed into a sequence of digital speech feature frames. Each speech feature frame can be thought of as a multi-dimensional vector that represents various characteristics of the speech signal present during a short time window of the speech. For example, the multi-dimensional vector of each speech frame can be derived from cepstral features of the short time Fourier transform spectrum of the speech signal (MFCCs)—the short time power or component of a given frequency band—as well as the corresponding first- and second-order derivatives ("deltas" and "delta-deltas"). In a continuous recognition system, variable numbers of speech frames are organized as "utterances" representing a period of speech followed by a pause, which in real life loosely corresponds to a spoken sentence or phrase.

The ASR system compares the input utterances to find statistical acoustic models that best match the vector sequence characteristics and determines corresponding representative text associated with the acoustic models. More formally, given some input observations A, the probability that some string of words W were spoken is represented as P(W|A), where the ASR system attempts to determine the most likely word string:

$$\hat{W} = \underset{W}{\mathrm{argmax}} P(W \mid A)$$

Given a system of statistical acoustic models, this formula can be re-expressed as:

$$\hat{W} = \underset{W}{\mathrm{argmax}} P(W) P(A \mid W)$$

where P(A|W) corresponds to the acoustic models and P(W) reflects the prior probability of the word sequence as provided by a statistical language model reflecting the probability of given word in the recognition vocabulary occurring.

The acoustic models are typically probabilistic state sequence models such as hidden Markov models (HMMs) that model speech sounds using mixtures of probability distribution functions (Gaussians). Acoustic models often represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the models are organized together as words, phrases, and sentences, additional language-related information is also typically incorporated into the models in the form of a statistical language model.

The words or phrases associated with the best matching model structures are referred to as recognition candidates or hypotheses. A system may produce a single best recognition candidate—the recognition result—or multiple recognition hypotheses in various forms such as an N-best list, a recognition lattice, or a confusion network. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

One specific application of ASR technology is for automatic transcription of real-world audio from speech sessions with multiple different speakers such as teleconferences, meeting records, police interviews, etc. There appears to be a large commercial market for accurate but inexpensive automatic transcription of such speech sessions. In many specific contexts the combination of the acoustic conditions and the speaking styles mean that current state-of-the-art ASR technology is unable to provide an accurate transcription. Manual transcriptions by human transcriptionists are generally very slow and expensive to obtain because of the time required—human transcriptionists typically need to listen to the audio many times.

SUMMARY

Embodiments of the present invention are directed to a graphical user interface for human guided audio source separation in a multi-speaker automated transcription system receiving audio signals representing speakers participating together in a speech session. A speaker avatar for each speaker is distributed about a user interface display to suggest speaker positions relative to each other during the speech session. There also is a speaker highlight element on the interface display for visually highlighting a specific speaker avatar corresponding to a current active speaker in the speech session to aid a human transcriptionist listening to the speech session to identify the active speaker. A speech signal processor performs signal processing of the audio signals to isolate an audio signal corresponding to the highlighted speaker avatar. A session transcription processor performs automatic speech recognition (ASR) of the signal processed audio signal for the speech session as supervised by the human transcriptionist and reflecting position of the speaker highlight element.

The speaker highlight element may be controllable by the human transcriptionist to select the speaker avatar for the active speaker for the session transcription processor to use the corresponding audio signal for the active speaker for performing ASR. The speaker highlight element also may be controllable by the human transcriptionist to select a corresponding portion of audio space for examination. And the speaker highlight element may be lockable by the human transcriptionist to fix it in place, in which case, there may be a highlight lock element on the user interface display indicating to the human transcriptionist when the speaker highlight element is locked. In addition or alternatively, the speaker highlight element may be automatically controllable by the session transcription processor to indicate to the human transcriptionist the speaker avatar for the speaker being treated as the active speaker. In some embodiments, the speaker avatars are stationary and the speaker highlight element rotates on the interface display for visually highlighting a specific speaker avatar corresponding to an active speaker. Alternatively, the speaker highlight element may be stationary and the speaker avatars rotate on the interface display for visually highlighting a specific speaker avatar corresponding to an active speaker The user interface display may also provide an audio energy heat map display element indicating to the human transcriptionist current sources of audio energy. There may be a time-based display of audio energy in a portion of audio space corresponding to the speaker highlight element. The speaker highlight element may be a beam-shaped highlight element.

The audio signals may be from one or more simultaneous recordings of an earlier speech session. In that case, the highlight element may be controllable by the human transcriptionist to select different portions of audio space for examination during different replays of one or more recordings. Or the audio signals may be from a real time speech session in progress. The session transcription processor also may include an audio playback module for providing to the human transcriptionist an audio playback of the signal processed audio signal including spatial direction information to suggest to the human transcriptionist relative positions of the speech session speakers; for example, a stereo audio playback.

Embodiments of the present invention also include a graphical user interface for human guided audio source separation in a multi-speaker automated transcription system receiving multiple different audio signals representing multiple different speakers participating together in a speech session. A speaker avatar for each speaker is distributed about an user interface display to suggest speaker positions relative to each other during the speech session. A speech signal processor performs signal processing of the audio signals to isolate an audio signal corresponding to the highlighted speaker avatar. An audio playback module provides to the human transcriptionist an audio playback of the signal processed audio signal including spatial direction information to suggest to the human transcriptionist relative positions of the speech session speakers. A session transcription processor performs automatic speech recognition (ASR) of the signal processed audio signal for the speech session as supervised by the human transcriptionist.

In specific such embodiments, the audio playback may be a stereo audio playback. The audio signals may be from one or more simultaneous recordings of an earlier speech session, and the user interface may be controllable by the human transcriptionist to select different portions of audio space for examination during different replays of one or more recordings. Or the audio signals may be from a real time speech session in progress.

DETAILED DESCRIPTION

It is difficult for human transcriptionists to process multiple simultaneous audio channels involving multiple speakers during a single recording. Embodiments of the present invention aid a transcriptionist listening to the speech session to identify the active speaker in a speech session by providing a speaker highlight element on a user interface display to visually highlight a specific speaker avatar on the user interface display corresponding to a currently active speaker in the speech session. The transcriptionist can control and move a speaker highlight beam around a display of the audio space in an intuitive way such that they can easily locate a speaker or isolate sounds within that space. This makes it easy and intuitive to manipulate the multiple audio channels to better isolate the speakers during the audio recording. The transcriptionist can better visualize the audio scene, better differentiate the different speakers, and better process the multiple audio channels that are available.

Figure 1:
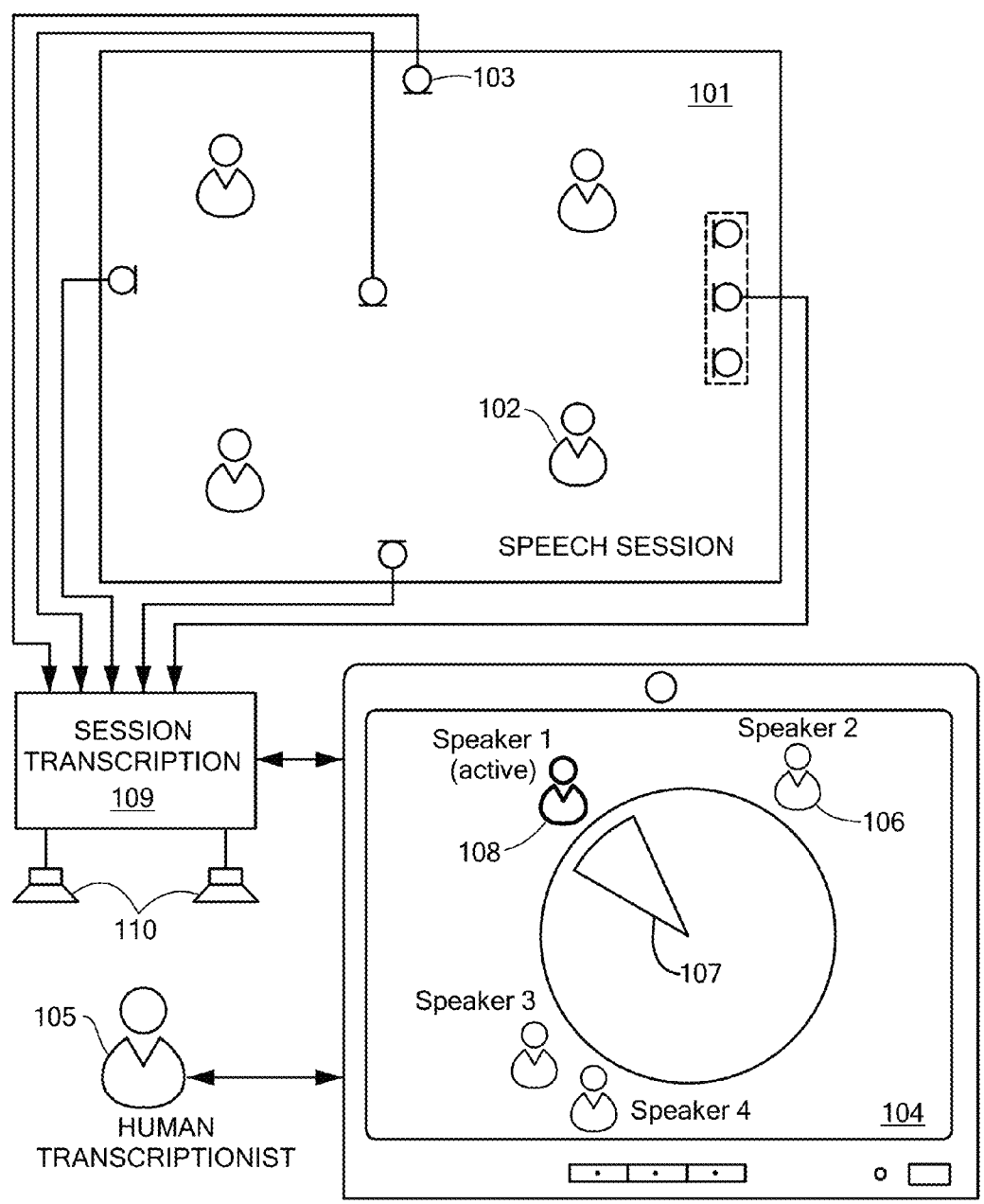
FIG. 1 shows elements of an arrangement for human guided audio source separation in a multi-speaker automated transcription system according to one embodiment of the present invention.
Figure 2:
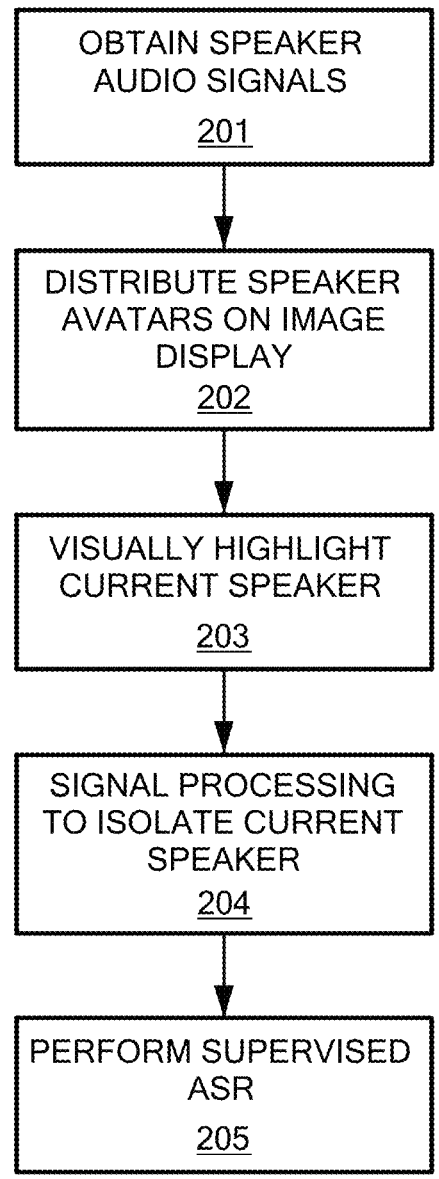
FIG. 2 shows various steps in a method for human guided audio source separation in a multi-speaker automated transcription system according to an embodiment of the present invention.

FIG. 1 shows an example of an arrangement using a speaker highlight element on a user interface display for speech session transcription using automatic speech recognition (ASR) and FIG. 2 shows various steps in a corresponding transcription method according to an embodiment of the present invention. Audio signals from a speech session 101 with one or more speakers 102 are developed by multiple microphones 103 (e.g., from a heterogeneous collection of microphones and/or one or more multi-microphone arrays), step 201, and recorded using multiple recording channels. The audio signals may be from one or more simultaneous recordings of an earlier speech session 101, or from a real time speech session 101 in progress.

A user interface display 104 for a transcriptionist 105 enables human guided audio source separation of the multiple audio signals for the speech session 101. The user interface display 104 provides a speaker avatar 106 for each speaker 102 arranged to suggest speaker positions relative to each other during the speech session 101, step 202. There also is a speaker highlight element 107 on the interface display 104 for visually highlighting a specific speaker avatar 108 corresponding to an active speaker in the speech session 101, step 203, to aid the transcriptionist 105 to identify the active speaker, to separate speech from background noise or other speech, and for correct automatic speaker identification of utterances. The user interface display 104 is a graphical user interface (GUI) for visualizing the relative positions of the speakers 102 during the speech session 101, and allows the transcriptionist 105 to manipulate the playback of the multiple audio channels to sonically isolate the speakers 102 to improve comprehension and transcription quality. That is, a speech signal processor, e.g., within a session transcription processor 109 or elsewhere in the system, performs signal processing of the audio signals to isolate an audio signal corresponding to the highlighted specific speaker avatar 108, step 204. The session transcription processor 109 performs automatic speech recognition (ASR) of the signal processed audio signals for the speech session 101 as supervised by the transcriptionist 105 and reflecting position of the speaker highlight element 107, step 205.

The speaker highlight element 107 may be automatically controllable by the session transcription processor 109 to indicate to the transcriptionist 105 where the system believes the audio is originating from, the active speaker avatar 108 for the speaker being treated as the active speaker, and the relative positions of the speakers 102 as determined by an automatic speaker identification arrangement (e.g., part of the session transcription processor 109, or a separate element).

The speaker highlight element 107 also may be controllable by the transcriptionist 105 to select the active speaker avatar 108 for the session transcription processor 109 to use the corresponding audio signal for the active speaker for performing ASR. When the audio signals are from recordings of an earlier speech session 101, the speaker highlight element 107 also may be controllable by the transcriptionist 105 to select different portions of audio space for examination during different replays of one or more of the recordings. The audio played to the transcriptionist 105 is limited to the beam position of the speaker highlight element 107, and the transcriptionist 105 can manually move the speaker highlight element 107 around the circle to direct it to different areas of the audio space. This can sweep the audio space to search for a different source of an utterance, if the transcriptionist 105 believes that the displayed active speaker avatar 108 is not the actual speaker of a given utterance. The beam of the speaker highlight element 107 can also be moved by the transcriptionist 105 to isolate individual speakers 102 in the event of concurrent utterances.

The beam-shape of the speaker highlight element 107 represents the angle of the audio beam that the audio processor of the a session transcription processor 109 is using to isolate sounds within the audio space. The transcriptionist 105 typically would be able to both move the beam of the speaker highlight element 107 around the display space and control its angle and width with the keyboard and the mouse, as desired. For example, the ALT-up and ALT-down cursor keys can be used to move the beam of the speaker highlight element 107 clockwise and anti-clockwise respectively. The up arrow key can be used for clockwise movement because it is analogous to the hands on a clock, where up is "forward" in time, and similarly the down arrow key would backwards in time (anti-clockwise). The ALT-left and ALT-right arrows can increase and decrease the width of the beam. ALT-Tab can cycle through the speakers 102 snapping the beam to them in turn. The ALT key may be a consistent system key to use for all hotkeys relating to the audio-positioning speaker highlight element 107.

In some embodiments, the session transcription processor 109 may include an audio playback module with one or more playback speakers 110 that provides to the transcriptionist 105 an audio playback of the signal processed audio signal. Advantageously the audio playback may include spatial direction information to suggest to the human transcriptionist relative positions of the speech session speakers 102 relative to the angle of the speaker highlight element 107. For example, the audio playback may be in the form of a multi-channel playback signal such as a stereo audio playback, or a 5.1 or 7.1 multi-channel audio playback. Such a directional audio playback would help the transcriptionist 105 more correctly identify the location of speakers and sounds. A session speaker 102 speaking to the left or the right of the beam of the speaker highlight element 107 would be processed by the audio playback module in the session transcription processor 109 to play back the corresponding audio to either the left or the right playback speaker 110 to aid the transcriptionist 105 to envision a mental model of the audio scene and to correctly place the source of that speaker.

Figure 3:
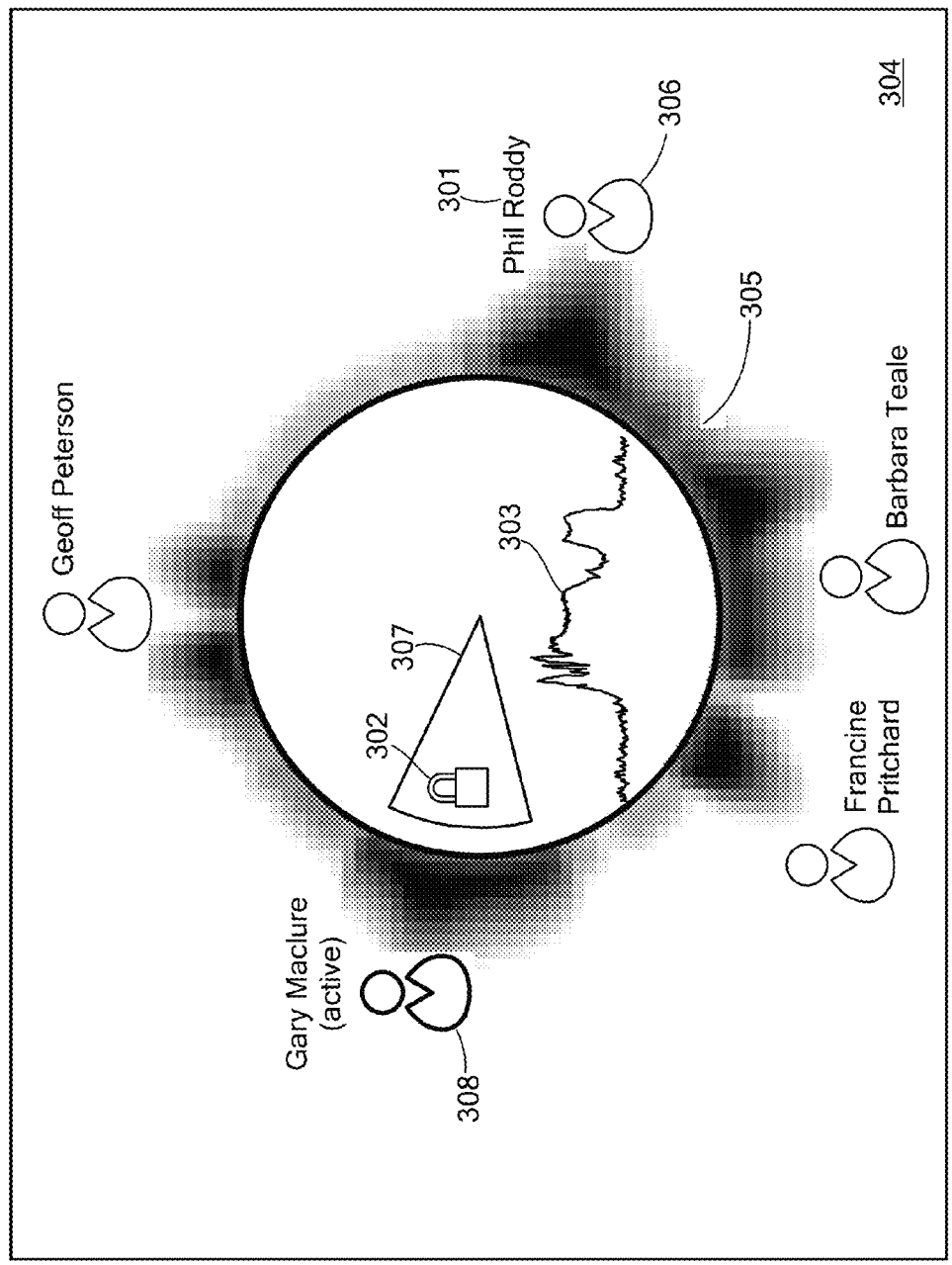
FIG. 3 shows another example of an interface display having a controllable audio highlight beam according to an embodiment of the present invention.

FIG. 3 shows another example of an interface display 304 having a controllable beam speaker highlight element 307 according to an embodiment of the present invention. The speaker highlight element 307 is lockable by the transcriptionist to fix it in place as indicated by highlight lock element 302. After moving the speaker highlight element 307 to a specific position on the interface display 304, it should also be releasable it so that the system can take back control after the utterance is complete. This could be done automatically when the system has enough confidence that another speaker has started speaking, or it could be manually under the control of the transcriptionist. For example, pressing and holding the ALT key could lock and unlock the speaker highlight element 307.

The user interface display 304 also provides an audio energy heat map display element 305 indicating to the human transcriptionist the current sources of audio energy for the speech session. In this case, the heat map display element 305 is in the specific form of a large audio graph stretched around the circumference of the virtual table, providing a position angle based audio graph (rather than the more conventional time-based audio graph). In this case, the darker regions of the heat map display element 305 indicate where there is greater audio energy, and conversely the lighter regions indicate less audio energy. In the center of the interface display 304 there also is a time-based display of audio energy in the portion of audio space corresponding to the speaker highlight element 307. This would therefore represent the audio signal currently being heard by the transcriptionist.

The speaker avatar 306 for each speaker is identified with speaker name 301, and the active speaker avatar 308 is in a different color. The system may be able to further automatically annotate the transcription text output with the speaker name 301 as each utterance is transcribed. The transcriptionist can change the speaker name 301 and re-assign them to different points in the audio scene when/if the corresponding speaker moves around during the speech session.

While the foregoing indicates that the speaker highlight element 307 rotates around the interface display 304, that some transcriptionist users might like it to work the other way round, with the speaker highlight element 307 being stationary in a constant position on the user interface 304 (e.g., horizontal or vertical) and the speaker avatars 306 rotating around the user interface under the control of the transcriptionist to rotate the active speaker avatar 308 to the end of the speaker highlight element 307. Such operation could be the default in some embodiments and/or it may be a user-selectable option.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A graphical user interface for human guided audio source separation in a multi-speaker automated transcription system receiving a plurality of different audio signals representing a plurality of different speakers participating together in a speech session, the system comprising:
   a speaker avatar for each speaker distributed about an user interface display to suggest speaker positions relative to each other during the speech session;
   a speaker highlight element on the interface display for visually highlighting a specific speaker avatar corresponding to an active speaker in the speech session to aid a human transcriptionist listening to the speech session to identify the active speaker;
   a speech signal processor for performing signal processing of the audio signals to isolate an audio signal corresponding to the highlighted speaker avatar;
   a session transcription processor for performing automatic speech recognition (ASR) of the signal processed audio signal for the speech session as supervised by the human transcriptionist and reflecting position of the speaker highlight element; and
   an audio energy heat map display element on the user interface display indicating to a human transcriptionist current sources of audio energy for each of the plurality of different speakers simultaneously.

2. The interface according to claim 1, wherein the speaker highlight element is lockable by the human transcriptionist to fix it in place.

3. The interface according to claim 2, further comprising:
   a highlight lock element on the user interface display indicating to the human transcriptionist when the speaker highlight element is locked.

4. The interface according to claim 1, wherein the speaker highlight element is automatically controllable by the session transcription processor to indicate to the human transcriptionist the speaker avatar for the speaker being treated as the active speaker.

5. The interface according to claim 1, further comprising:
   a time-based display of audio energy in a portion of audio space corresponding to the speaker highlight element.

6. The interface according to claim 1, wherein the speaker highlight element comprises a beam-shaped highlight element.

7. The interface according to claim 1, wherein the audio signals are from one or more simultaneous recordings of an earlier speech session.

8. The interface according to claim 7, wherein the speaker highlight element is controllable by the human transcriptionist to select different portions of audio space for examination during different replays of one or more recordings.

9. The interface according to claim 1, wherein the audio signals are from a real time speech session in progress.

10. The interface according to claim 1, wherein the session transcription processor includes an audio playback module for providing to the human transcriptionist an audio playback of the signal processed audio signal including spatial direction information to suggest to the human transcriptionist relative positions of the speech session speakers.

11. The interface according to claim 10, wherein the audio playback is a stereo audio playback.

12. The interface according to claim 1, wherein the speaker avatars are stationary and the speaker highlight element rotates on the interface display for visually highlighting a specific speaker avatar corresponding to an active speaker.

13. The interface according to claim 1, wherein the speaker highlight element is stationary and the speaker avatars rotate on the interface display for visually highlighting a specific speaker avatar corresponding to an active speaker.

14. A graphical user interface for human guided audio source separation in a multi-speaker automated transcription system receiving a plurality of different audio signals representing a plurality of different speakers participating together in a speech session, the system compromising:
   a speaker avatar for each speaker distributed about an user interface display to suggest speaker positions relative to each other during the speech session;
   a speech signal processor for performing signal processing of the audio signals to isolate an audio signal corresponding to the highlighted speaker avatar;
   an audio energy heat map display element on the user interface display indicating to a human transcriptionist current sources of audio energy for each of the plurality of different speakers simultaneously;
   an audio playback module for providing to the human transcriptionist an audio playback of the signal processed audio signal including spatial direction information to suggest to the human transcriptionist relative positions of the speech session speakers; and
   a session transcription processor for performing automatic speech recognition (ASR) of the signal processed audio signal for the speech session as supervised by the human transcriptionist.

15. The interface according to claim 14, wherein the audio playback is a stereo audio playback.

16. The interface according to claim 14, wherein the audio signals are from one or more simultaneous recordings of an earlier speech session.

17. The interface according to claim 16, wherein the user interface is controllable by the human transcriptionist to select different portions of audio space for examination during different replays of one or more recordings.

18. The interface according to claim 14, wherein the audio signals are from a real time speech session in progress.

* * * * *